United States Patent [19]
Karhuketo et al.

[11] Patent Number: 5,612,129
[45] Date of Patent: Mar. 18, 1997

[54] SHEET MATERIAL

[75] Inventors: Hannu Karhuketo; Alpo A. Pollari; Pentti K. Rautanen, all of Valkeakoski, Finland

[73] Assignee: Yhtyneet Paperitehtaat Oy, Valkeakoski, Finland

[21] Appl. No.: 384,342

[22] Filed: Feb. 1, 1995

Related U.S. Application Data

[63] Continuation of Ser. No. 43,348, Apr. 6, 1993, abandoned.

[30] Foreign Application Priority Data

Apr. 7, 1992 [FI] Finland ................... 921538

[51] Int. Cl.$^6$ ................... B32B 5/16
[52] U.S. Cl. ................... 428/323; 428/326; 428/327; 428/340; 428/537.5; 428/221
[58] Field of Search ................... 156/62.2; 162/129, 162/132, 147; 428/323, 326, 327, 221, 340, 537.5

[56] References Cited

U.S. PATENT DOCUMENTS

| | | | |
|---|---|---|---|
| 2,962,459 | 11/1960 | Ash et al. | 523/129 |
| 3,244,783 | 4/1966 | Eissfeldt et al. | 264/112 |
| 3,661,688 | 5/1972 | Wheeler | 264/119 |
| 3,718,536 | 2/1973 | Downs et al. | 523/129 |
| 3,919,017 | 11/1975 | Shoemaker et al. | 156/62.2 |
| 4,457,978 | 7/1984 | Wawzonek | 428/326 |
| 4,810,445 | 3/1989 | Lamb, Sr. et al. | 264/112 |
| 5,089,206 | 2/1992 | Kia | 156/62.2 |
| 5,137,668 | 8/1992 | Lamb, Sr. | 264/112 |

FOREIGN PATENT DOCUMENTS

| | | |
|---|---|---|
| 0358119 | 3/1990 | European Pat. Off. . |
| 0409525 | 1/1991 | European Pat. Off. . |
| 885321 | 11/1988 | Finland . |

OTHER PUBLICATIONS

Japanese Patent Publication No. JP 56–000146, Database WPIL, Week 8110, Derwent Publications, Ltd., London, GB.
Japanese Patent Publication No. JP 03–113078, Database WPIL, Week 9125, Derwent Publications, Ltd., London, GB.
German Patent Publication No. DE 3516862, Database WPIL, Week 8647, Derwent Publications, Ltd., London, GB.

Primary Examiner—Thurman K. Page
Assistant Examiner—Kathryne E. Shelborne
Attorney, Agent, or Firm—Morrison & Foerster

[57] ABSTRACT

The invention concerns a paper-based, soft or semi-hard sheet material which contains a core layer of compressed shredded paper with surface layers. The material is suited for use as inner end shields for paper reels, for example.

2 Claims, 3 Drawing Sheets

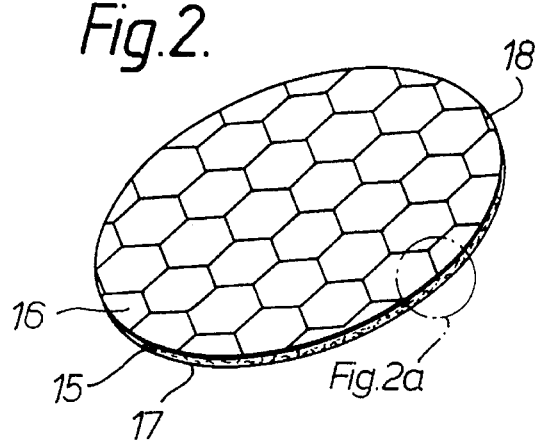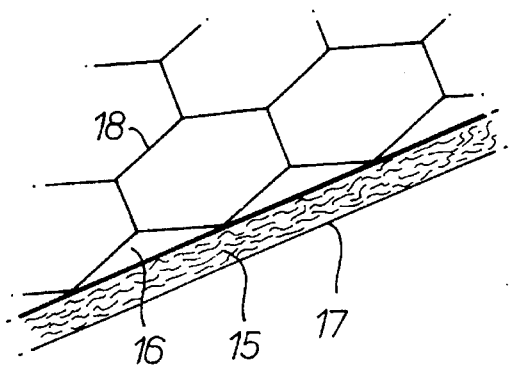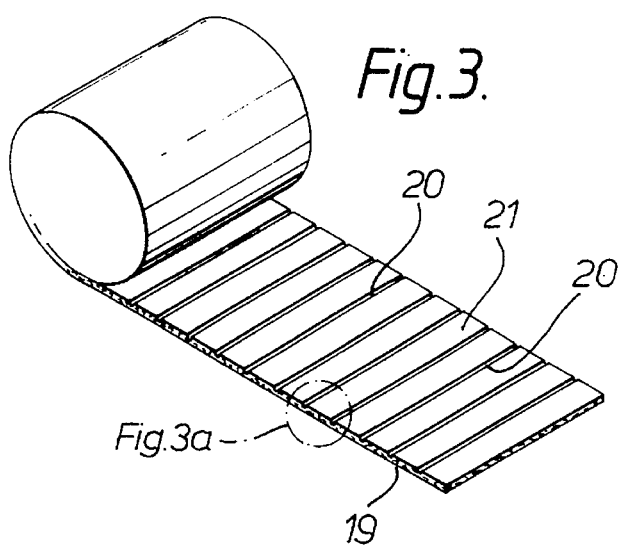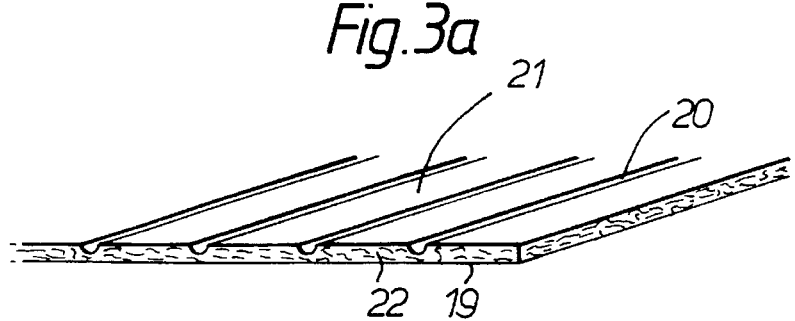

SHEET MATERIAL

This application is a continuation, of application Ser. No. 08/043,348, filed Apr. 6, 1993, now abandoned.

FIELD OF TECHNOLOGY

The invention concerns a paper-based sheet material, its method of production and products made from it.

BACKGROUND TO THE TECHNOLOGY

Paper-based sheet materials have previously been made of board, cardboard, corrugated cardboard or kraft board.

GENERAL DESCRIPTION OF THE INVENTION

The invention and certain of its applications are defined in the patent claims.

The sheet material in accordance with the invention comprises a core layer made of soft or semi-hard compressed shredded paper-based material and of surface layers on both sides of it. The surface layers are preferably made of paper-based material. The material can especially be used for making end shields for paper reels, wrappings or building boards.

DETAILED DESCRIPTION OF THE INVENTION

The Production of the Sheet

Figure 1:
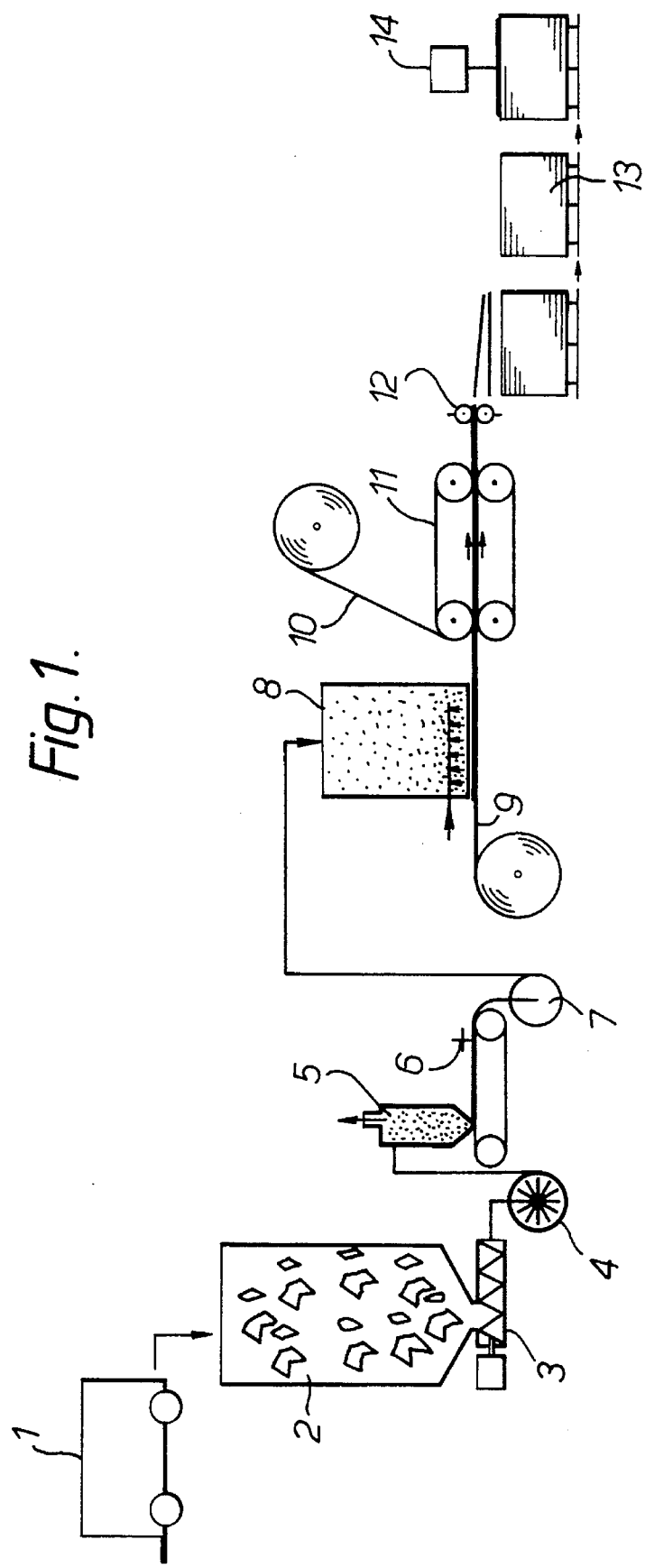

The sheet is normally produced in such a way that wastepaper is shredded to the desired particle size, adhesive is added to the shredded paper, the shredded paper is spread evenly in a layer of desired thickness, the surface layers of the desired type are placed above and below the shredded paper for gluing, and the sheet panel thus obtained is pressed between plates to a desired thickness and kept under compression for the time necessary for adhesion. The compression plates may be heated if necessary.

The sheets may be made one sheet at a time, continuously, or continuously in steps.

The density, porosity, softness and elasticity of the core layer can be set by varying the particle size of the shredded paper, the gluing (quantity and type of glue) and the pressure the sheet is exposed to during compression.

The size of the shredded paper particles varies from that of single fibers to about 20×20 mm. A typical size is approx. 5×5 mm.

The density of the core layer is approx 0.1–0.8 kg/dm$^3$, preferably approx 0.2–0.5 kg/dm$^3$, and most preferably approx. 0.2–0.4 kg/dm$^3$. In order to suitably achieve sufficiently low densities, it may be useful to crumple the shredded paper particles.

The sheet thickness is approx. 2–20 mm.

The adhesive used may be, for example, urea-formaldehyde resin glue. Relatively little adhesive is used. A suitable amount is approx. 2–10% of the weight of the shredded paper. Starch adhesives, polyethenes or like are also suitable for the application.

In one application, heat sealable fusible waste plastic among the wastepaper can be used as the glue. In this case the sheets to be glued are heated enough to make the adhesive melt. As it cools, the solidifying plastic will then bind the shredded paper together and bind the surface layers to the shredded paper. It is best for the cooling to take place between plates so that the sheet is of the desired thickness and as even as possible. For example, approx. 10–25% by weight (optimally approx. 14–20% by weight) of polyethene among the shredded paper will be sufficient for adhesion. If there is not enough plastic, the plastic content can be made suitable by adding shredded paper which contains more plastic or by adding eg waste plastic. Plastic gluing can avoid the need to add adhesive. Conventional plastics are also less harmful from the point of view of environmental protection than ordinary glues.

Most preferably the raw materials for the sheet comprise of recovered waste matter.

The paper surface layer is typically of kraft paper (grammage eg approx. 60–300 g/m$^2$). Laminated paper can also be used for the surface layer. To attain moistureproofing, for example, a plastic layer can be laminated onto the paper (eg polyethene 10–30 g/m$^2$). Newsprint or another similar paper grade can also be used as the surface material.

The surface layers can be made also of other such materials as will keep the structure soft or semi-hard.

Desired additives can also be used in the paper. The sheet's surfaces can also be treated after compression with suitable additives (eg, protective agents).

The sheet can easily be stamped with a desired pattern while between the compression plates, on either or both sides. The best method for this purpose is replaceable stamping parts such as wires or meshes on the surface of the compression plate. An on-line or off-line calander or embossing unit can also be used.

The production process of the sheet is shown schematically in FIG. 1.

The wastepaper carried to the mill by truck 1 is stored in silo 2. The paper is taken from the silo by conveyor 3 to crusher 4. The crushed paper is blown into cyclone separator 5, in which the finest matter is separated. The remaining shredded paper is dosed by feeder 6 to fan 7 by which the shredded paper is blown on to sprinkler unit 8. The sprinkler unit is also fed with a desired amount of adhesive.

The shredded paper particles obtained by crushing are preferably crumpled. This can be done, for example, by leading the particles through a converging screw conveyor, or between two belt conveyors which move at different velocities, or between rotating discs.

In sprinkler unit 8, the shredded paper and adhesive mixed with it are dispensed as an even layer of desired thickness onto lower paper web 9. Upper paper web 10 is led onto the shredded paper layer, after which the papers and the shredded paper are compressed to the desired thickness in heatable compressor 11. The sheet material web thus produced is cut up as desired and stacked by cutting machine 12, kept if necessary in temporary storage 13 and cut into pieces of desired shape by cutting machine 14 (eg, plane cutting and creasing platen press).

End Shield

Reels of paper are normally packaged at a paper mill in such a way that inner end shields are placed at the ends of the reels, a wrapping extending beyond the ends of the reel is wrapped around the reel sheath, the part of the wrapping extending beyond the end is folded evenly against the reel end, and an outer end label is then glued on top. The purpose of the inner end shield is, above all, to protect the end of the reel from impacts and depressions caused by hard particles.

FIGS. 2 and 2a show an inner end shield for a paper reel, in accordance with the invention, consisting of a core layer 15 made of shredded paper, inner surface layer 16 and outer surface layer 17.

The density of the core layer is optimally approx. 0.2–0.4 g/cm$^3$. The thickness of the sheet is selected according to the weight of the paper reel. For the smallest reels (less than one tonne) as little as 3 mm will be sufficient, while for large reels (3–5 tonnes) a suitable thickness will be 7 mm, for example, and for especially large reels shields as thick as 15 mm may be used. Thicker end shields may also be used when especially good protection is desired.

The most suitable material for the surface layers is kraft paper (eg approx. 60–120 g/m$_2$).

At least one of the surface layers should preferably be made moistureproof, for example, by using a polyethene film (eg approx. 15–25 g/m$^2$) in the paper as a moisture barrier, either separately or pressed on top of the paper. The polyethene film is best placed against the core layer, whereupon the layers will bind successfully.

A moisture barrier is not needed on both of the surface layers. It is most conveniently made on inner surface layer 16, whereupon it will be best protected from rupture. An additional advantage in this case is that a porous, moisture-absorbent layer 15 will in this case be left between the moisture barrier and the tight wrapping folded over the end from the side of the reel. This will prevent water which has penetrated between the wrapping and the end piece from moving into the edge of the end of the reel when, for example, the reel is jolted.

The other surface layer of the end shield has been imprinted with a mesh or grid grooving 18. This makes it easier to remove the end shields from each other in a pile. The end shields are often put in place automatically on the wrapping machines by suction cups. In view of the suction cups, it may be more secure to make the grooving on inner surface layer 16. The grooving also increases stiffness.

The grooving is accomplished for instance by placing suitable wires between the compression plate and the surface layers before the compression takes place.

The end shields in accordance with the invention have advantages including but not limited to the following ones, in comparison with the board, cardboard, corrugated board or kraft board currently used:

1) It is easy to make end shields of various thicknesses, whereupon an optimal shield can be chosen in view of the reel weight and the need for protection.
2) The end shield is stiff, and the stiffness is the same in all directions. Such shields are easily handled by machine.
3) Hermetic sealing is good, so the end shields can be manipulated well with suction cups.
4) The flatness of the end shields is exceptionally good, whereupon it is easy to make the packaging sufficiently tight.
5) The absorption of hard particles is exceptionally good owing to the softness of the core layer. Hard particles which are smaller than the thickness of the end shield, for example, grains of sand on the floor, will sink into the end shield without causing a larger depression in the end of the reel. The end shield is highly successful also in preventing folds in the wrapping from causing depressions in the end of the reel.
6) Water absorption is exceptionally good. Ordinary moisture (brief transportation in rain, condensation, small puddles under the base) will not cause moisture damage to the reel.
7) The resistance to the stress of transportation is good. Normal moisture, vibration or excess weight will not substantially affect the protective characteristics of the end shield. For example, even if the reel is lowered at a slight angle onto a base, the edge of the shield will not be irreparably flattened, thereby causing a risk of stacks leaning.

Wrapping Material 1

When the surface of the sheet is grooved with unilateral transverse grooves, the result is a flexible wrapping material. The grooving can be suitably accomplished at the compression stage by using suitable wires or like as described above. Another alternative is to cut the grooves on the surface of the compressed sheet. The cutting can be done either before or after joining the surface layers to the core layer. Such a material is well suited as a packaging or protective material especially for longer objects which are cylindrical in cross-section. Such applications include packagings for steel rods, rollers and steel rolls. The material is also well suited for protection when hoisting. The surface layer be reinforced if desired by a suitable mesh or coated with aluminium foil, for example. It is also possible to add protective agents for the item to be wrapped, such as rustproofing agents.

The material has exceptionally good protective characteristics, especially compared with corrugated board. Because of the grooving, the material can, however, also be supplied in rolls.

FIGS. 3 and 3a show wrapping material of this type. The material includes inner surface layer 19, external surface layer 21 with transversal grooves 20, with a shredded paper layer 22 between them.

The material can also be grooved lengthwise along the roll, whereupon very long wrappings can be made of it.

Figure 4:
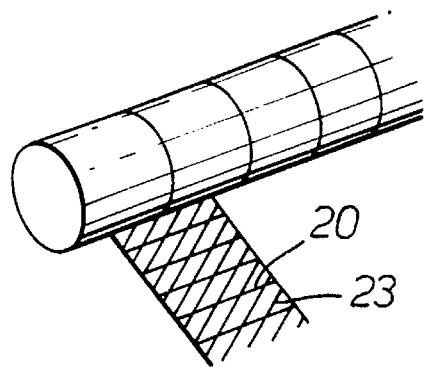

If the material is also grooved diagonally, the result is a material suitable for wrapping long, round objects in several overlapping layers. FIG. 4 shows material of this type wrapped around a bar. The material includes both transversal grooves 20 and diagonal grooves 23 on the outer surface layer.

The lining papers or the whole material can be impregnated with anticorrosion agent. It can be mixed with the glue.

Wrapping Material 2

Wrapping material can also be made in such a way that the core layer of the sheet consists of separate strips of shredded paper going in one direction. This results in a material that is even more flexible and is well suited as a wrapping for objects which are angular in cross-section.

Figure 5:
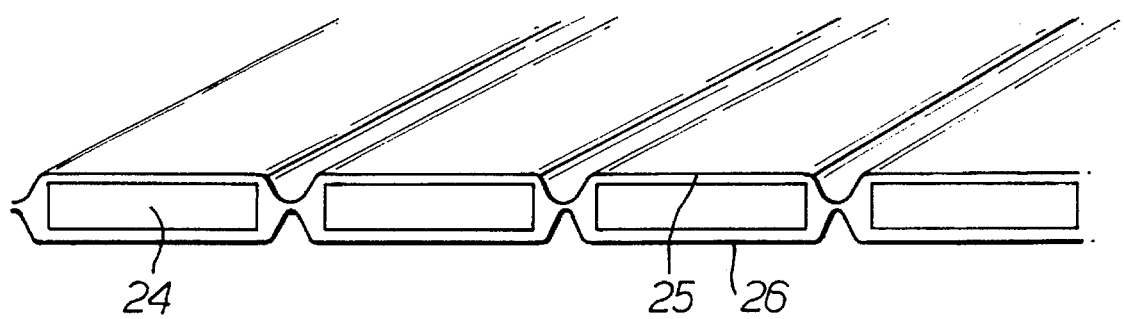

FIG. 5 shows an application of this type. It shows strips 24 cut from a shredded paper board, placed side by side separately. Surface layers 25 and 26 have been attached to the upper and lower sides of the strips. The surface layer may be mesh-reinforced or laminated (with plastic or aluminium foil, for example) as necessary.

Because of the softness, the wrapping material gives good shelter agains impacts.

Building Board

The sheet material is also suitable for building purposes in special locations requiring soft boards or boards which are flexible in a certain direction. An added advantage compared with, for example, corrugated board is its better sound insulation and acoustic properties.

A typical application is underlay for parquet flooring.

Figure 6:
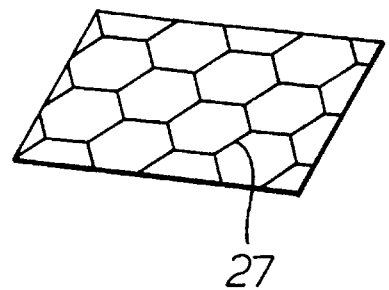

FIG. 6 shows building board 27 with a mesh surface pattern.

It is often necessary to make building boards nonburning. This can be achieved by adding suitable antiflame chemicals or by using suitable surface or lining material, such as glass tissue, mineral fiber web, aluminium foil or antiflame treated paper.

We claim:

1. A sheet material comprising:

(a) an inner surface layer and an outer surface layer, at least one of said inner layer and said outer layer being moisture-proof and at least one of said inner layer and said outer layer having mesh grooving imprinted thereon; and (b) a compressed, adhesive-bonded, core layer disposed between said inner and outer surface layers, said core layer comprising shredded paper-based material and shredded plastic material, and said core layer having a density 0.1–0.8 kg/dm$^3$.

2. A protected paper reel comprising, a paper reel, an inner end shield disposed against an end of said paper reel, said end shield having an inner moisture-proof surface, an outer surface, and a compressed, adhesive-bonded core layer disposed between said inner moisture-proof surface and said outer surface, said core layer comprising shredded paper and polymeric plastic, and said inner moisture proof surface having profiled grooves.

* * * * *